(No Model.)
F. E. MITCHELL.
UMBRELLA FRAME.
No. 600,289. Patented Mar. 8, 1898.
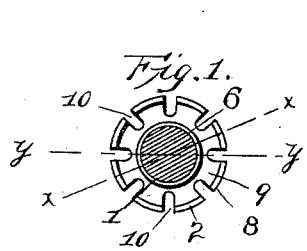
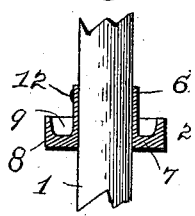
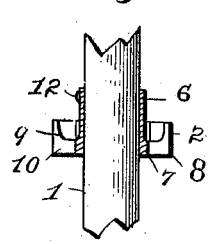
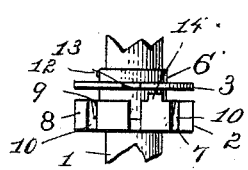
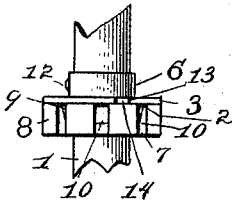
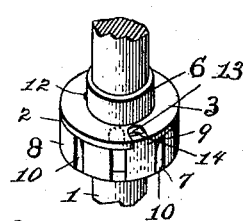
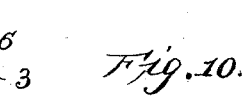
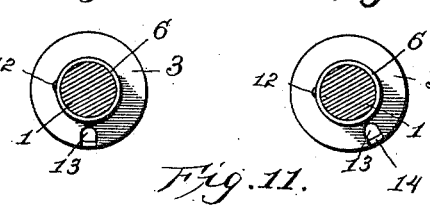
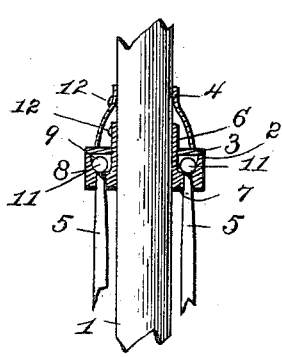
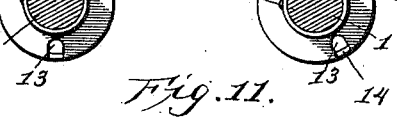
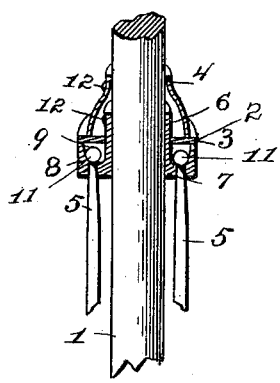
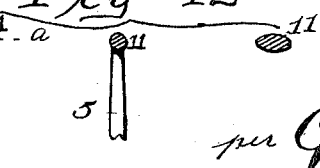
Witnesses
F. C. Barry
E. C. Duffy
Inventor
F. E. Mitchell
per C. E. Duff
Attorney
THE NORRIS PETERS CO., PHOTO-LITHO., WASHINGTON, D. C.

UNITED STATES PATENT OFFICE.

FRANK E. MITCHELL, OF BLOOMINGTON, INDIANA.

UMBRELLA-FRAME.

SPECIFICATION forming part of Letters Patent No. 600,289, dated March 8, 1898.

Application filed April 14, 1897. Serial No. 632,157. (No model.)

*To all whom it may concern:*

Be it known that I, FRANK E. MITCHELL, of Bloomington, in the county of Monroe and State of Indiana, have invented certain new and useful Improvements in Umbrella-Frames; and I do hereby declare that the following is a full, clear, and exact description of the invention, which will enable others skilled in the art to which it appertains to make and use the same, reference being had to the accompanying drawings, and to the numerals of reference marked thereon, which form part of this specification.

My invention relates to umbrella-frames, and has for its object to cheapen and simplify their manufacture and at the same time improve their construction and operation.

With this object in view my invention consists in the improved construction, arrangement, and combination of parts hereinafter fully described and afterward specifically pointed out in the claims.

In the accompanying drawings, Figure 1 is a top plan view of what is known as the "top notches," being the piece which is secured to the staff and receives the upper ends of the ribs. Fig. 2 is a vertical sectional view through the same on the dotted line $x\ x$ of Fig. 1, a portion of the staff being shown broken away above and below. Fig. 3 is a similar sectional view of the same parts on the line $y\ y$ of Fig. 1. Fig. 4 is a view in side elevation showing the top notches on the staff with the cap raised to permit of the insertion of a rib. Fig. 5 is a similar view of the same parts in position to lock the ribs in place. Fig. 6 is a perspective view of the same parts in the position shown in Fig. 5. Fig. 7 is a top plan view of the same parts in the position shown in Fig. 4. Fig. 8 is a similar view of the same parts in the position shown in Fig. 5. Fig. 9 is a vertical sectional view through the parts as shown in Fig. 5, showing also the covering for the top notches and cap and two of the ribs in place. Fig. 10 is a perspective view of the parts shown in Fig. 9. Fig. 11 is vertical section showing another and often preferred form of my invention in which the cap and cover for the top notches are made in one piece. Fig. 12 is a vertical detail view in elevation and vertical and transverse section of the end of one of the ribs.

Like numerals of reference mark the same parts wherever they occur in the various figures of the drawings.

Referring to the drawings by numerals, 1 is the staff; 2, the top notches; 3, the cap therefor; 4, the cover for the same, and 5 the ribs.

The top notches are made in a single piece consisting of the inner sleeve 6, composed of a thin upper part and an enlarged lower section or base to closely embrace the staff, a horizontal bottom flange 7 on said base, and a vertical annular flange 8, raised on the outer edge of said flange 7, leaving an annular groove 9 entirely around the base 6. From this groove, extending outwardly from the top to the bottom of the annular vertical flange 8, are the notches 10, in which the ribs 5 are pivotally held by means of balls 11 on their upper ends, which have the form of ellipsoids, said notches 10 being cut entirely through the annular flange from top to bottom and through base of the annular groove or socket 9, so that the rib, with its ball in the annular groove, may hang down close to and parallel with the staff.

The top notches 2 and the cover 4 may be secured to the staff 1 by any suitable means—as, for instance, by means of a pin 12, which passes through holes in these parts in a well-known manner. One pin may be used to secure the top notches and another for the cover, or a single pin may be made to serve both, if desired. In putting the parts together, the top notches being on the staff and the cap 3 and cover 4 not yet in place, the ribs are slipped in the top of the notches 10, with their balls 11 in the annular groove 9, (which forms a socket for all the rib-balls,) in which position they will be allowed to swing freely in a vertical line and may be folded in close to and parallel with the staff to close the umbrella. To hold them securely in this position, so that there will be no liability to displacement, the washer-like cap 3 is brought down on the sleeve 6 until it rests upon the annular flange 8, and is secured in that position by means of the same pin which secures the sleeve 6 to the staff or by any other suitable means. The whole arrangement may then be covered from view and exposure by the cover 4, which also slides on the staff and is secured by any suitable means.

If desired, the cap 3 and cover 4 may be made in one piece, as illustrated in Fig. 11, and secured to the sleeve 6 by a slight thread, as at 12', on the outside of the sleeve 6 and inside of cover 4, which thread may be only a single turn or less, if desired.

For purposes of repairing or replacing one or more broken ribs I have arranged so that any single rib may be removed from the top notches without disturbing the others. This I do by making in the cap 3 a notch 13 of substantially the same width as each of the notches 10. The cap being rotatable upon the sleeve 6, this notch 13 may be brought to coincide with any one of these notches, as shown in Figs. 4 and 7, so that the rib in that notch is free to move without disturbing the rest of the ribs.

To firmly fix the cap 3 against undesired rotation, I provide the annular flange 8 between any two adjacent notches 10 with an upward extension 14, over which the notch 13 in cap 3 will engage, thus not only preventing the cap from rotating, but also leaving all the notches 10 closed at the top as thoroughly as though the cap 3 were not provided with said notch 13.

The simplicity and advantages of my construction will be obvious from the foregoing description.

All the parts may be cheaply and strongly made by stamping, drawing, or casting. When in position, the ribs have absolute freedom of motion, but in vertical lines only and are restrained from wabbling, and great ease in removing and replacing any single one or all of the ribs is secured without taking the whole frame to pieces. Similarly-constructed joints may also be applied to the sliding thimble or runner and stretcher when desired.

Having thus fully described my invention, what I claim is—

1. In umbrellas, a collar provided with a base having an annular groove therein, vertical notches cut through the base, said base having an upward extension, a rotatable cap resting on said base and covering the groove and having a slot or perforation located over the groove for the purpose of removing a rib if necessary, and into which the upward extension fits to hold the cap in place, as set forth.

2. In umbrellas, a collar provided with a base having an annular groove therein and an upward extension therefrom, vertical notches extending through the base, a rotatable cap having an interiorly-threaded cover integral therewith, the cap resting on said base thereby covering the groove and having a slot or perforation into which the upward extension fits, a threaded sleeve on the handle of the umbrella engaging the threaded cap, as set forth.

In testimony that I claim the foregoing as my own I affix my signature in presence of two witnesses.

FRANK E. MITCHELL

Witnesses:
S. C. DODDS,
C. A. CRAVEN.